(12) United States Patent
Arnell

(10) Patent No.: US 11,759,940 B2
(45) Date of Patent: Sep. 19, 2023

(54) BATTERY COMPARTMENT FOR POWER TOOLS

(71) Applicant: Globe (Jiangsu) Co., Ltd., Jiangsu (CN)

(72) Inventor: Thomas Arnell, Huskvarna (SE)

(73) Assignee: Globe (Jiangsu) Co., Ltd., Jiangsu (CN)

( * ) Notice: Subject to any disclaimer, the term of this patent is extended or adjusted under 35 U.S.C. 154(b) by 0 days.

(21) Appl. No.: 17/741,778

(22) Filed: May 11, 2022

(65) Prior Publication Data
US 2022/0266440 A1 Aug. 25, 2022

Related U.S. Application Data

(63) Continuation of application No. 16/651,247, filed as application No. PCT/CN2017/103737 on Sep. 27, 2017, now Pat. No. 11,358,268.

(51) Int. Cl.
*B25F 5/00* (2006.01)
*B25F 5/02* (2006.01)
*H01M 50/202* (2021.01)

(52) U.S. Cl.
CPC .............. *B25F 5/02* (2013.01); *H01M 50/202* (2021.01); *H01M 2220/30* (2013.01)

(58) Field of Classification Search
CPC ...................................... B25F 5/00; B25F 5/02
See application file for complete search history.

(56) References Cited

U.S. PATENT DOCUMENTS

| | | | | |
|---|---|---|---|---|
| 2008/0184568 A1* | 8/2008 | Gieske | ...................... | B25F 5/02 173/217 |
| 2011/0308831 A1* | 12/2011 | Martinsson | ......... | H01M 50/213 173/217 |
| 2012/0073847 A1* | 3/2012 | Nagasaka | ................. | B25F 5/02 173/217 |
| 2014/0116737 A1* | 5/2014 | Iwata | ........................ | B25F 5/02 173/20 |
| 2015/0263592 A1* | 9/2015 | Kawakami | .............. | B25F 5/008 451/359 |
| 2015/0280532 A1* | 10/2015 | Mizutani | ................... | H02K 7/14 310/50 |
| 2015/0375315 A1* | 12/2015 | Ukai | ...................... | B23D 51/00 30/392 |
| 2015/0375416 A1* | 12/2015 | Haneda | .................... | B27B 17/00 30/383 |
| 2017/0106521 A1* | 4/2017 | Kelleher | ................. | B24B 23/028 |
| 2017/0259452 A1* | 9/2017 | Kachi | ...................... | B25F 5/008 |
| 2017/0297216 A1* | 10/2017 | Kachi | ...................... | B27B 17/00 |
| 2017/0373614 A1* | 12/2017 | Lewis | ................... | B24B 23/028 |
| 2018/0332766 A1* | 11/2018 | Ackerman | ............ | A01D 34/902 |

* cited by examiner

*Primary Examiner* — Eyamindae C Jallow
(74) *Attorney, Agent, or Firm* — Rooney IP, LLC

(57) ABSTRACT

A housing for power tools such as chainsaws, blowers, trimmers or hedge trimmers. The housing has a front end at which a tool of the power tool is attached. The housing includes a rear end and a top side. A battery compartment is provided at the top side of the housing and extends inside the housing and has a shape adapted to receive a battery. The shape is essentially cuboidal and has a rectangular cross section looking at the top side of the housing. The short sides of the rectangular cross section are substantially parallel with the rear end and the front end of the housing.

8 Claims, 2 Drawing Sheets

BATTERY COMPARTMENT FOR POWER TOOLS

CROSS-REFERENCE TO RELATED APPLICATIONS

This application is a continuation of U.S. application Ser. No. 16/651,247, filed Mar. 26, 2020, which claims priority to PCT Application No. PCT/CN2017/103737, filed on Sep. 27, 2017, the disclosures of which are hereby incorporated by reference in their entirety.

TECHNICAL FIELD

The present invention relates generally to housings that are used for power tools, such as chainsaws, trimmers, hedge trimmers and the like. Especially, the present invention relates to a battery compartment provided in the housing for power tools.

BACKGROUND ART

During the last decades, battery-driven power tools such as chainsaws, trimmers, hedge trimmers, etc. have become more and more popular due to the development of more efficient batteries. However, the more powerful batteries are bulkier, which may cause problems when designing the housing of the power tools, and especially the battery compartment provided in the housing.

The bulkiness of the battery may lead to a bulkiness of the housing, which in turn may lead to power tools that are more difficult to maneuver. Maneuverability in turn is a safety aspect, since many power tools may cause severe injuries if handled in a wrong way.

U.S. Pat. No. 8,286,359 discloses a battery-operated chainsaw, wherein the battery is located at one side of a frame of the chainsaw. The purpose of the placement of the battery is to provide a center of gravity for the chainsaw that is located at least partially beneath or in front of a front handle. The front handle is formed by the frame that also forms a rear handle. In U.S. Pat. No. 8,286,359, the chainsaw is of the type where the battery is attached direct towards a frame and not into a battery compartment. Such battery compartments in prior art may be placed at different positions of the housing.

Thus, there is a need for a battery compartment that does not build bulkiness to the housing of power tools in order to increase the maneuverability and thereby the safety of the power tool.

SUMMARY OF INVENTION

An object of the present invention is to accomplish a housing for power tools with a battery compartment that does not contribute to the bulkiness of the housing and that makes the power tool easier to maneuver. A further object with the present invention is to provide a battery compartment into which it is easy to insert and release a battery.

According to one aspect of the present invention this is accomplished by a housing for a power tool, having a front end, at which front end a tool of the power tool is attached, a rear end and a top side. A battery compartment is provided at the top side of the housing, the battery compartment extending inside the housing and having a shape adapted to receive a battery. The shape is essentially cuboidal and has a rectangular cross section when looking at the top side of the housing and the short sides of the rectangular cross section are substantially parallel with the rear end and the front end of the housing.

In one embodiment, the battery compartment is skewed backwards towards the rear end with an angle of between 5 to 30 degrees in relation to an axis that is perpendicular to the top side of the housing, preferably the angle is between 7 and 15 degrees.

In another embodiment, the housing further comprises a release button arranged to eject the battery from the battery compartment during removal of the battery.

Furthermore, a gasket may be provided between the battery compartment and the battery, such that the battery compartment is sealed.

Providing the battery compartment such that the short sides of the rectangular cross section of the battery compartment are substantially parallel with the rear end and the front end of the housing makes it possible to reduce the width of the housing and thereby design a slimmer power tool. The advantage with a slimmer power tool is that it is possible to have the power tool closer to the body during operation thereof. This makes the power tool easier to manoeuvre and thus increases the safety of the power tool.

Another advantage according to embodiments of the present invention is that the battery compartment is skewed backwards towards the rear end with an angle in relation to an axis that is perpendicular to the top side of the housing. This makes it easy for an operator of the power tool to insert and release the battery from the battery compartment.

BRIEF DESCRIPTION OF DRAWINGS

The invention will now be described, by way of example, with reference to the accompanying drawings, in which.

DESCRIPTION OF EMBODIMENTS

In the following, a detailed description of a housing for power tools according to embodiments of the present invention will be presented.

Figure 1:
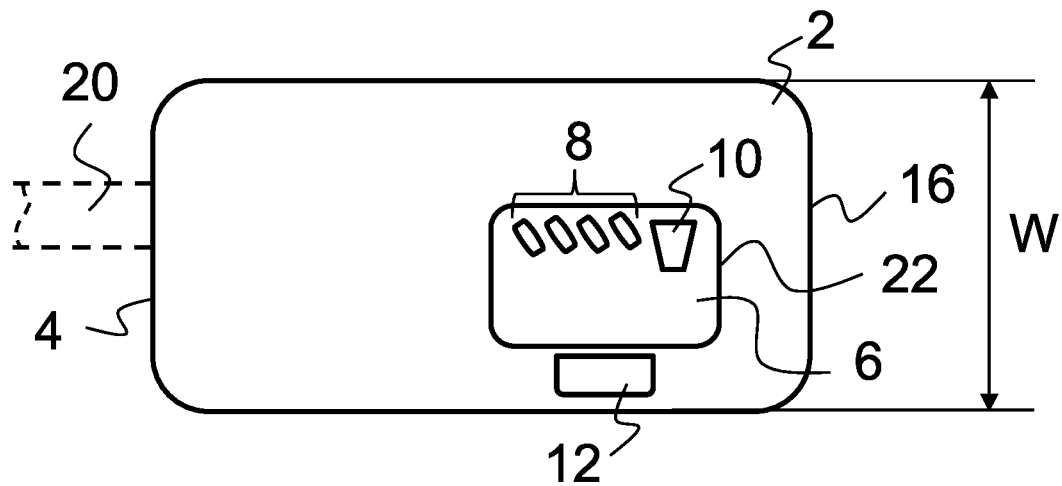
FIG. 1 is a schematic view from above of a housing for power tools.
Figure 2:
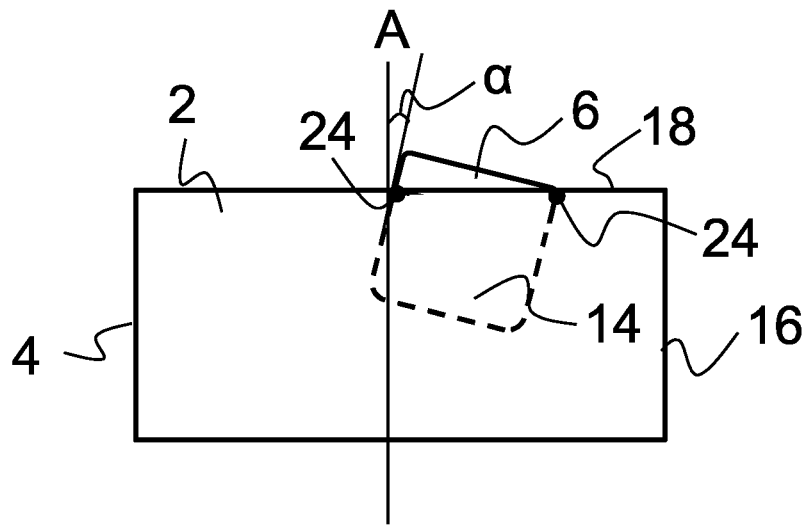
FIG. 2 is a schematic side view of the housing for power tools.

With reference to FIG. 1 and FIG. 2 a housing 2 for power tools is shown. FIG. 1 shows the housing 2 from a view above and FIG. 2 shows the housing 2 in a side view. The housing 2 comprises a front end 4, at which a tool 20 of the power tool is attached. The tool 20 is schematically indicated with dotted lines and will be very different depending on the type of power tool that is used. In context of this application a power tool is a tool that is used primarily in the garden or sometimes also in the forest and is driven or powered by a battery. Examples of such power tools may be, chainsaws, blowers, trimmers, hedge trimmers etc.

Now returning to FIG. 1 and FIG. 2 where the housing 2 further comprises a rear end 16 and a top side 18. A battery compartment 14 is provided at the top side 18 of the housing 2 and extends inside the housing. The extension of the battery compartment 14 is indicated by dotted lines in FIG. 2. The shape of the battery compartment 14 is adapted to receive a battery 6. In general, the shape of the battery compartment 14 is essentially cuboidal with an essentially rectangular cross section looking at the top side 18 of the housing 2. One very important feature of the present invention is that the short sides 22 of the rectangular cross section are substantially parallel with the rear end 16 and the front end 4 of the housing 2. This makes it possible to design a slimmer housing 2, i.e. a housing 2 having a small width W. Having a housing with a small width W is advantageous sines it allows the power tool to come closer to the body of a user during operation of the power tool. This makes the power tool easier to manoeuvre and thus safer.

In FIG. 1 the battery 6 is provided with power indicator lamps 8 that indicate the remaining power in the battery 6, when a power check button 10 is pushed. Furthermore, the housing may also be provided with a release button 12, which when pushed ejects the battery 6 out of the battery compartment 14, such that a user may extract the battery 6 from the battery compartment 14 and replace the battery 6.

As is evident from FIG. 2, the battery compartment 14 is skewed backwards towards the rear end 16 with an angle α of between 5 to 30 degrees in relation to an axis A that is perpendicular to the top side 18 of the housing 2. The skewing is advantageous since the angle makes it easier for an operator to insert and extract the battery 6 from the battery compartment 14. In a preferred embodiment, the skewing angle α may be in the range of 7 and 15 degrees.

In another embodiment, the housing 2 may also be provided with a gasket 24 that is provided between the battery compartment 14 and the battery 6 when the battery 6 is inserted in the battery compartment 14, such that the battery compartment 14 is sealed.

Figure 3:
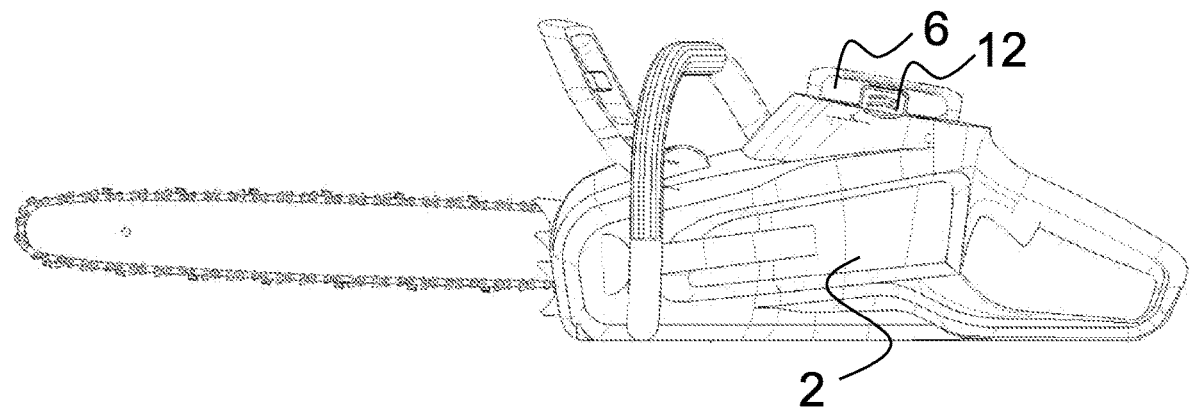
FIG. 3 is a perspective view of a chainsaw having a housing according to one embodiment of the present invention.
Figure 4:
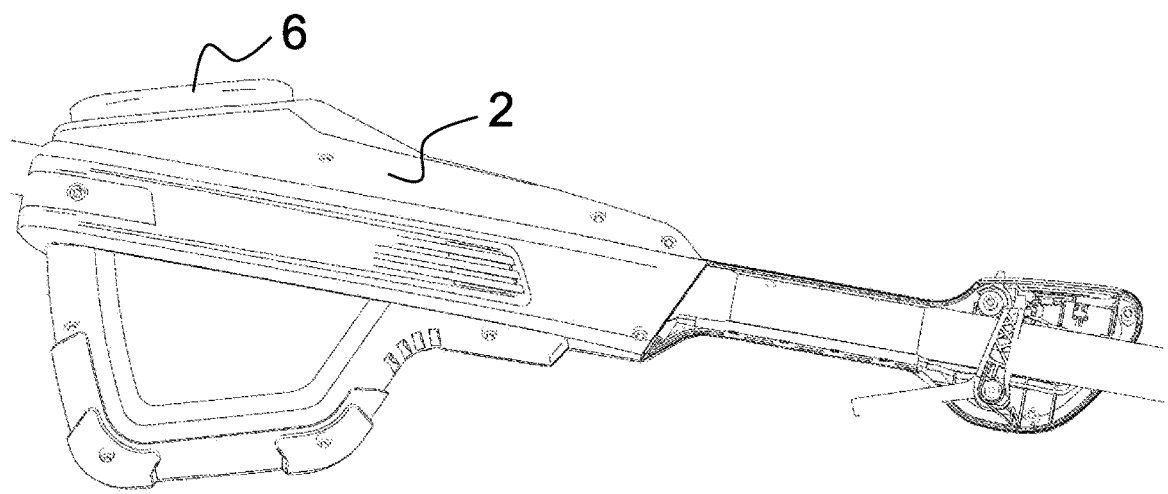
FIG. 4 is a perspective view of a trimmer having a housing according to one embodiment of the present invention.

FIG. 3 and FIG. 4 show two implementations of the present invention, wherein the housing 2 is used for two different power tools, i.e. a chainsaw in FIG. 3 and trimmer in FIG. 4. As can be seen the battery 6 is skewed making it easy for a user to access and exchange the battery 6.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A housing for a power tool, the housing comprising:
a front end configured to be connected to a tool of the power tool;
a rear end;
a top side;
a battery compartment provided on the top side for receiving a battery, the battery compartment extending inside the housing; and
a release button disposed on the housing for releasing the battery;
wherein the battery compartment is skewed backwards towards the rear end with an angle (α) of between 5 to 30 degrees in relation to an axis (A) that is perpendicular to the top side.

2. The housing according to claim 1, wherein the angle (α) is between 7 and 15 degrees.

3. The housing according to claim 1, wherein a gasket is provided for placement between the battery compartment and the battery, such that the battery compartment is sealed.

4. The housing according to claim 1, wherein the housing is adapted to be part of a chainsaw, a blower, a trimmer or a hedge trimmer.

5. The housing according to claim 1, wherein the battery compartment is essentially cuboidal with an essentially rectangular cross section as viewed from the top side.

6. The housing according to claim 5, wherein respective short sides of the essentially rectangular cross section are substantially parallel with the rear end and the front end of the housing.

7. A housing for a power tool, the housing comprising:
a front handle and a rear handle;
a front end configured to be connected to a tool of the power tool;
a rear end;
a top side;
a battery compartment provided on the top side for receiving a battery, the battery compartment extending inside the housing; and
a release button disposed on the housing for releasing the battery;
wherein the battery compartment is located between the front handle and the rear handle.

8. A power tool, comprising:
a housing including:
a front end having a tool;
a handle;
a rear end;
a top side;
and a battery compartment provided on the top side for receiving a battery, the battery compartment extending inside the housing;
wherein the battery compartment is skewed backwards towards the rear end with an angle (α) of between 5 to 30 degrees in relation to an axis (A) that is perpendicular to the top side.

* * * * *